(12) United States Patent
Jeschke et al.

(10) Patent No.: US 8,141,155 B2
(45) Date of Patent: *Mar. 20, 2012

(54) PREDICTIVE ASSESSMENT OF NETWORK RISKS

(75) Inventors: KoniKaye Jeschke, Minneapolis, MN (US); Devon Jorlett, Minneapolis, MN (US); James R. Cunningham, Shakopee, MN (US)

(73) Assignee: Prevari, Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/014,124

(22) Filed: Jan. 26, 2011

(65) Prior Publication Data

US 2011/0162073 A1 Jun. 30, 2011

Related U.S. Application Data

(63) Continuation of application No. 11/694,659, filed on Mar. 30, 2007, now Pat. No. 7,900,259.

(60) Provisional application No. 60/895,339, filed on Mar. 16, 2007.

(51) Int. Cl.
  *G06F 21/00* (2006.01)
(52) U.S. Cl. ............ 726/22; 713/161; 713/187; 713/189
(58) Field of Classification Search ...................... 726/22
  See application file for complete search history.

(56) References Cited

U.S. PATENT DOCUMENTS

| | | | |
|---|---|---|---|
| 5,944,821 A * | 8/1999 | Angelo ............................ | 726/22 |
| 6,178,509 B1 * | 1/2001 | Nardone et al. ................ | 726/22 |
| 6,219,805 B1 | 4/2001 | Jones et al. | |
| 6,298,445 B1 | 10/2001 | Shostack et al. | |
| 6,594,761 B1 * | 7/2003 | Chow et al. .................... | 713/190 |
| 6,980,927 B2 * | 12/2005 | Tracy et al. .................... | 702/181 |
| 7,003,561 B1 * | 2/2006 | Magdych et al. ............. | 709/223 |
| 7,096,503 B1 | 8/2006 | Magdych et al. | |
| 2002/0147803 A1 | 10/2002 | Dodd et al. | |
| 2003/0046128 A1 | 3/2003 | Heinrich | |
| 2003/0191942 A1 * | 10/2003 | Sinha et al. ..................... | 713/181 |
| 2003/0217039 A1 | 11/2003 | Kurtz et al. | |
| 2003/0236995 A1 | 12/2003 | Fretwell, Jr. | |
| 2005/0183072 A1 * | 8/2005 | Horning et al. ................ | 717/140 |
| 2005/0278786 A1 | 12/2005 | Tippett et al. | |
| 2005/0283834 A1 | 12/2005 | Hall et al. | |
| 2006/0026688 A1 | 2/2006 | Shah | |
| 2007/0016955 A1 | 1/2007 | Goldberg et al. | |
| 2007/0143851 A1 | 6/2007 | Nicodemus et al. | |

OTHER PUBLICATIONS

Mell et al., "Common Vulnerability Scoring System", Dec. 4, 2006, IEEE Security & Privacy, vol. 4 Issue 6, pp. 85-89.*

(Continued)

*Primary Examiner* — Taghi Arani
*Assistant Examiner* — Kenneth Chang
(74) *Attorney, Agent, or Firm* — Fish & Richardson P.C.

(57) ABSTRACT

In certain implementations, systems and methods for predicting technology vulnerabilities in a network of computer devices are based on software characteristics of processes executing at the computer devices. In one preferred implementation, the system identifies processes at various computing devices within an organization, identifies software characteristics associated with the processes, applies technology controls to the software characteristics, determines risk indexes based on the modified technology control, applies administrative controls to the risk indexes, aggregates the indexes to create risk model, determines alternative risk models, and presents the risk models for consideration and analysis by a user.

22 Claims, 9 Drawing Sheets

OTHER PUBLICATIONS

Hogganvik et al., "A Graphical Approach to Risk Identification, Motivated by Empirical Investigations", Nov. 23, 2006, Lecture Notes in Computer Science, vol. 4199, pp. 574-588.*

The State Intellectual Property Office of the People's Republic of China, Office Action for Application 200780052980.8, dated Jan. 26, 2011, 27 pages.

Carmichael, "A Domain Model for Evaluating Enterprise Security," Colorado Technical University (Colorado Springs), doctoral thesis, Sep. 2001, 166 pages.

International Search Report and Written Opinion for Application No. PCT/US2007/074833, mailed Feb. 5, 2008, 10 pages.

International Preliminary Repot and Written Opinion for Application No. PCT/US2007/074833, mailed Oct. 1, 2009, 6 pages.

H. Wei et al., "A Novel Approach to Cyberspace Security Situation Based on the Vulnerabilities Analysis", Intelligent Control and Automation 2006, vol. 1:4747-4751.

"Telecommunications and Internet converged Services and Protocols for Advanced Networking (TISPAN)"; Methods and protocols; Method and proforma for Threat, Risk, Vulnerability Analysis European Telecommunications Standards Institute, 2006, pp. 1-100.

Supplementary European Search Report for European Application No. 07840614.7, dated Mar. 10, 2011, 10 pages.

* cited by examiner

Network Scan Information

| | IP Address | Domain | Process | | Port | Protocol |
|---|---|---|---|---|---|---|
| 102a { | 192.168.0.10 | enterprise.com | *106a* | ftp | 20 | tcp/udp |
| | 192.168.0.10 | enterprise.com | *106b* | telnet | 23 | tcp/udp |
| | 192.168.0.10 | enterprise.com | *106c* | http | 80 | tcp |
| 102b { | 192.168.0.20 | enterprise.com | *108a* | netbios-ns | 137 | tcp/udp |
| | 192.168.0.20 | enterprise.com | *108b* | netbios-ds | 138 | tcp/udp |
| | 192.168.0.20 | enterprise.com | *108c* | netbios-ss | 139 | tcp/udp |
| 102c { | 192.168.0.30 | enterprise.com | *110a* | netbios-ns | 137 | tcp/udp |
| | 192.168.0.30 | enterprise.com | *110b* | netbios-ds | 138 | tcp/udp |
| | 192.168.0.30 | enterprise.com | *110c* | netbios-ss | 139 | tcp/udp |

Columns: 202, 204, 206, 208, 210. Table reference: 118.

FIG. 2

Software Characteristics

| Characteristic Name | Characteristic Value | |
|---:|:---:|:---|
| Process Name | ftp | _106a_ ⎱ |
| Process Port | 20 | ⎬ _302_ |
| Protocol | tcp/udp | ⎰ |
| Input Validation Level | 8 | ⎱ |
| Error Correction Level | 7 | |
| Buffer Overflow Level | 1 | |
| Software Complexity Level | 2 | |
| Multi-threading Level | 2 | |
| Software Structure Level | 4 | |
| Maintenance Level | 2 | |
| Configuration Files Level | 3 | |
| Invoking Processes Level | 9 | |
| Privileges Requirement Level | 2 | ⎬ _304_ |
| Multi-function Level | 3 | |
| Software Encryption/Hash Level | 7 | |
| Software Authentication (Know) Level | 1 | |
| Software Authentication (Have) Level | 5 | |
| Software Authentication (Are) Level | 5 | |
| Failover Mechanisms Level | 7 | |
| Time Function Usage Level | 1 | |
| Network Processing Level | 9 | |
| Trojan Indicator Level | 1 | |
| Audit Characteristics Level | 5 | ⎰ |

PREDICTIVE ASSESSMENT OF NETWORK RISKS

CROSS REFERENCE TO RELATED CASES

This application claims priority to U.S. patent application Ser. No. 11/694,659, filed Mar. 30, 2007, entitled "Predictive Assessment of Network Risks", which claims priority to U.S. provisional patent application 60/895,339, filed Mar. 16, 2007 by Jeschke et al., entitled "Predictive Assessment of Network Vulnerabilities," the contents of both of which are incorporated herein by reference.

BACKGROUND

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

One approach for predicatively assessing network vulnerabilities is described in a doctoral thesis entitled A Domain Model for Evaluating Enterprise Security by Martin Carmichael, Colorado Technical University (Colorado Springs), September 2001. One implementation of this approach has involved calculating metrics for confidentiality by summing, for the various software processes running in an enterprise, i) the arithmetic sum of constants assigned based on network, security level, invokes, and Trojan characteristics, ii) the sum of constants assigned based on encryption, configuration, invokes, privileges, and authentication characteristics multiplied by a weighting constant that reflected the relative impact of these characteristics on confidentiality, iii) a constant assigned based on the nature of the host, iv) a constant assigned based on the nature of technical controls (e.g., patch management or hard drive re-imaging), and v) a constant associated with administrative controls (e.g., security controls under ISO 17799). Values for integrity, audit and accountability were measured according to the same protocol, but with different software characteristics (including those additional characteristics shown in Table 1) were multiplied by different weighting variables depending on their relative contribution to the risk metric at issue. Values for controls were assigned based on industry experience with the extent to which a control affected overall risk and/or answers to surveys such as ISO17799 and DITSCAP surveys.

SUMMARY

In certain implementations, systems and methods for predicting technology vulnerabilities in a network of computer devices are based on software characteristics of processes executing at the computer devices. In one preferred implementation, the system identifies processes at various computing devices within an organization, identifies software characteristics associated with the processes, applies technology controls to the software characteristics, determines risk indexes based on the modified technology control, applies administrative controls to the risk indexes, aggregates the indexes to create risk model, determines alternative risk models, and presents the risk models for consideration and analysis by a user. In preferred implementations, the system evaluates the interaction or interdependency between software services to determine values for security metrics. In preferred implementations, risk indices are determined for various administrative and/or technology control settings to facilitate an analysis of the relative impact and value of administrative and/or technical controls. Also in preferred implementations, the system determines business unit specific risk factors, which can be advantageous where business units implement varying protocols and procedures and provide varied responses risk factor queries, and provides an aggregate risk index which is function of the individually determined business unit risk indexes.

The details of one or more embodiments of the invention are set forth in the accompanying drawings and the description below. Other features, objects, and advantages of various implementations will be apparent from the description and drawings, and from the claims.

DESCRIPTION OF DRAWINGS

FIG. 2 is a data structure showing an example of network scan information.

FIG. 3 is a data structure showing an example of software characteristics for a particular process.

Like reference symbols in the various drawings indicate like elements.

DETAILED DESCRIPTION OF ILLUSTRATIVE IMPLEMENTATIONS

Figure 1:
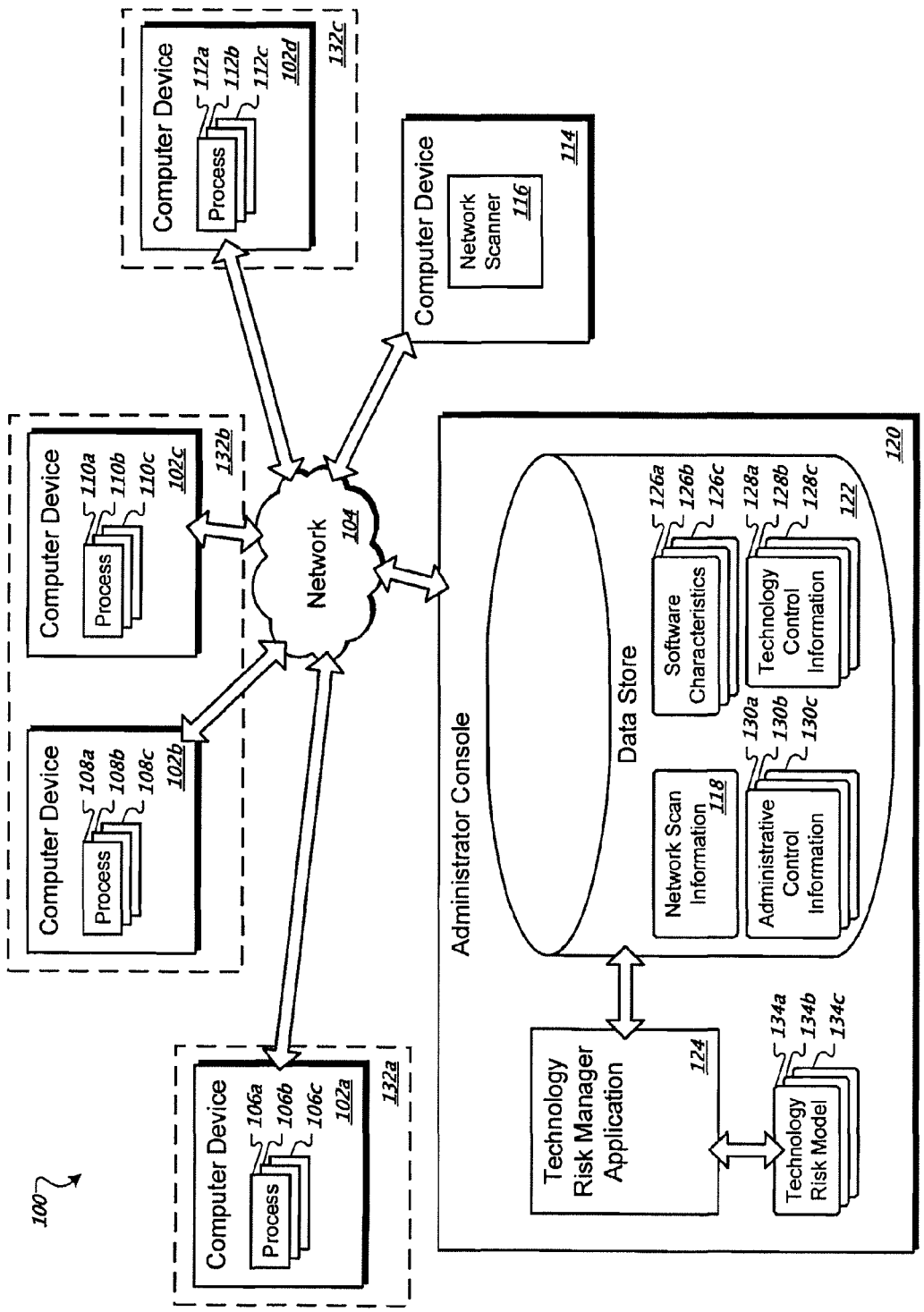
FIG. 1 is a block diagram showing an example of a system for technology risk management.

FIG. 1 is a block diagram showing an example of a system 100 for technology risk management. The system 100 may be, for example, a computer network within a business or enterprise. The system 100 includes one or more computer devices 102a-d that may be in communication through a network 104. The computer devices 102a-d may be, for example, desktop computers, laptop computers, servers, routers, firewalls, or other computer devices. The network 104 may be, for example, a local area network (LAN), a wide area network (WAN), the Internet, or some combination thereof. Each of the computer devices 102a, 102b, 102, and 102d executes one or more processes 106a-c, 108a-c, 110a-c, and 112a-c, respectively. The processes 106a-c, 108a-c, 110a-c, and 112a-c may be, for example, a Hypertext Transfer Protocol (HTTP) server, a Simple Network Management Protocol (SNMP) server, a Simple Mail Transfer Protocol (SMTP) server, a Network Basic Input/Output System (NetBIOS) name service, a NetBIOS session service, or a NetBIOS datagram distribution service to name a few.

The processes 106a-c, 108a-c, 110a-c, and 112a-c executing at the computer devices 102a, 102b, 102, and 102d, respectively, present risk to data and services provided by the system 100. Knowingly or unknowingly, a user may exploit features of the processes 106a-c, 108a-c, 110a-c, and 112a-c to compromise one or more risk categories of the system 100. For example, risk categories may include confidentiality, integrity, availability, and auditing (also referred to as accounting or accountability). These risk categories may be referred to as CIAA. In addition, other categories may be used to organize risk, such as non-repudiation, authentication, utility, possession/control, and authorization. In the embodiment of FIG. 1, confidentiality includes assurance of privacy regarding data or services, integrity may include assurance of non-alteration regarding data or services, availability may include assurance of the timely and reliable access to data and/or services, auditing includes assurance of tracing activities to a responsible and/or authorized individual, application, or device, non-repudiation includes providing proof of delivery to a sender and providing proof of a sender identity to a recipient regarding data and/or services, authentication includes verifying an identity of an individual, application, or device, utility includes usefulness regarding data and/or services, possession/control includes access to data and/or services other than personal identification information encompassed by a confidentiality category, and authorization includes granting specific types of service or data to a particular individual, application, or device.

The system 100 rates the processes 106a-c, 108a-c, 110a-c, and 112a-c in each of the CIAA risk categories. The ratings in each of the CIAA categories are referred to as CIAA risk indexes. The CIAA risk indexes indicate the likelihood of an unforeseen compromise occurring in a particular CIAA risk category. For example, each of the CIAA risk indexes may include a probability of an unforeseen compromise occurring or a predicted amount of time to elapse before an unforeseen compromise occurs. The system 100 calculates the CIAA risk indexes based on software characteristics. Each of the processes 106a-c, 108a-c, 110a-c, and 112a-c has an associated set of software characteristics that describe the properties of the respective process, as will be described further below.

The system 100 includes a computer device 114 that determines the processes executing at the computer devices 102a-d. Particularly, the computer device 114 executes a network scanner 116. The network scanner 116 may, for example, attempt to communicate with each network port on which the client devices 102a-d accept communication. Each network port may be associated with a particular process. The network scanner 116 may use the network port information to determine the processes executing at each of the computer devices 102a-d. Alternatively or in addition, the network scanner 116 may communicate with a service provided locally by each of the computer devices 102a-d. The local service at each of the computer devices 102a-d may determine the processes executing at the particular computer device and report the information to the network scanner 116. For example, the local service may be provided by the operating systems of the computer devices 102a-d or a module of the network scanner 116 that executes at each of the computer devices 102a-d. The network scanner 116 provides network scan information 118 to the system 100 for use in calculating CIAA risk indexes.

FIG. 2 is a data structure showing an example of the network scan information 118. The network scan information 118 lists the processes 106a-c, 108a-c, 110a-c, and 112a-c executing at the computer devices 102a, 102b, 102c, and 102d, respectively. For each of the processes 106a-c, 108a-c, 110a-c, and 112a-c, the network scan information 118 includes an Internet Protocol (IP) address 202 of the computer device, a network domain 204 of computer device, a name 206 of the process, a port number 208 used by the process, and a network protocol 210 used by the process. For example, the process 106a an ftp process executing at the computer device 102a. The process 106a accesses the network port 20 using Transmission Control Protocol (TCP) or User Datagram Protocol (UDP). The computer device 102a has an IP address of "192.168.0.10" and a network domain of "enterprise.com." In certain implementations, the network scan information 118 may include other information, such as a particular software manufacturer product represented by the process (e.g., Microsoft Internet Information Services) or a version of the process (e.g., Internet Information Services version 7.0).

Referring again to FIG. 1, the system 100 includes an administrator console 120. The administrator console 120 includes a data store 122 that stores the network scan information 118 received from the network scanner 116. In certain implementations, the administrator console 120 and/or the computer device 114 may be included in the computer devices 102a-d.

The administrator console 120 also includes a technology risk manager (TRM) application 124. The TRM application 124 uses the network scan information 118 to identify the processes 106a-c, 108a-c, 110a-c, and 112a-c executing at the computer devices 102a, 102b, 102c, and 102d, respectively. The TRM application 124 identifies software characteristics 126a-c associated with the processes 106a-c, 108a-c, 110a-c, and 112a-c. For example, the TRM application 124 may identify the software characteristics 126a, 126b, and 126c as being associated with the processes 106a, 106b, and 106c, respectively. The TRM application 124 may identify software characteristics associated with a process, for example, by matching the process name, port, and protocol listed in the network scan information 118 with a process name, port, and protocol listed in one of the software characteristics 126a-c. Alternatively or in addition, the TRM application 124 may use a manufacturer product name or product version to identify software characteristics associated with a process. In certain implementations, each combination of identifying information has an associated set of software characteristics.

FIG. 3 is an example of a data structure containing the software characteristics 126a for the process 106a. The software characteristics 126a includes process identification information 302. The identification information 302 may include, for example, a process name, port, and protocol that the TRM application 124 may match to information in network scan information 118. For example, the TRM application 124 may determine that the process name "ftp," port "20," and protocol "tcp/udp" in the software characteristics 126a match the corresponding name, port, and protocol in the network scan information 118.

The software characteristics 126a also include software characteristic values 304. The software characteristic values 304 indicate levels of properties of a process. For example, each of the software characteristic values 304 may be a numerical value ranging from zero to nine. The software characteristic values 304 may include, for example, a level of input validation employed by the process, a level of error correction and detection employed by the process, a level of buffer overflow prevention employed by the process, a level of complexity of the software in the process, a level of multi-threaded processing employed by the process, a level of structure of the software in the process, a level of maintenance required to keep the process working in a proper condition, a level of configuration file usage by the process, a level of invoking other processes, a level of user privilege checks performed by the process, a level of flexibility that the process contains, a level of encryption of hashing used by the process, a level of authentication employed by the process where something known to a user is provided (e.g., a password), a level of authentication employed by the process where something a user has is provided (e.g., an identification card or passcard), a level of authentication employed by the process where a user provides something from himself/herself (e.g., a fingerprint or a retinal pattern), a level of backup operations for automatically switching if the process fails, a level of time function usage by the process, a level of network usage by the process, a level of Trojan behavior by the process, and a level of logging used by the process.

Referring again to FIG. 1, the data store 122 may also include technology control information 128. The identified software characteristics may be modified by technology controls that effect processes or computer devices in the system 100. In general, technology controls may be elements (e.g., devices or services) within the system 100 that effect technology risk, but whose contribution to risk is not necessarily reflected in the software characteristics of the processes. For example, the technology controls may include controls, such as software/firmware/hardware patch management, data storage re-imaging control, network/computer intrusion detection, intrusion prevention (e.g., a firewall), transactional logging of activities in a network/computer, outsourcing logs to another entity, log review (e.g., manual or automated review process), alarming and alerting, a dummy computer designed to attract an intruder, computer virus scanning/removal application, token based 2-factor authentication (e.g., a password and a keycard or hasp), use of digital signatures to authenticate data and permissions, offsite backup for data storage, server clustering, encrypted data storage (e.g., using a key specific to a user on that machine), use of strong passwords (e.g., if the system employs the requirement for 3 out of 4 types of text characters selected from letters, numbers, capital letters, and symbols), centralized location for user authentication, fingerprint biometric authentication, and hand geometry biometric authentication. For example, if a data storage re-imaging control is in place at one or more computer devices, then the TRM application 124 may remove any contribution to the CIAA risk indexes made by unknown processes. Unknown processes may be eliminated from the computer devices after a re-image, so that calculations to the CIAA risk indexes for unknown processes may be removed as well. In another example, the presence of a technology control, such as a firewall, may be used to algorithmically decrease or increase one or more software characteristic values for a particular process. The algorithm may be subtractive, additive, linear multiple, linear division or exponential function, for example.

Figure 4:
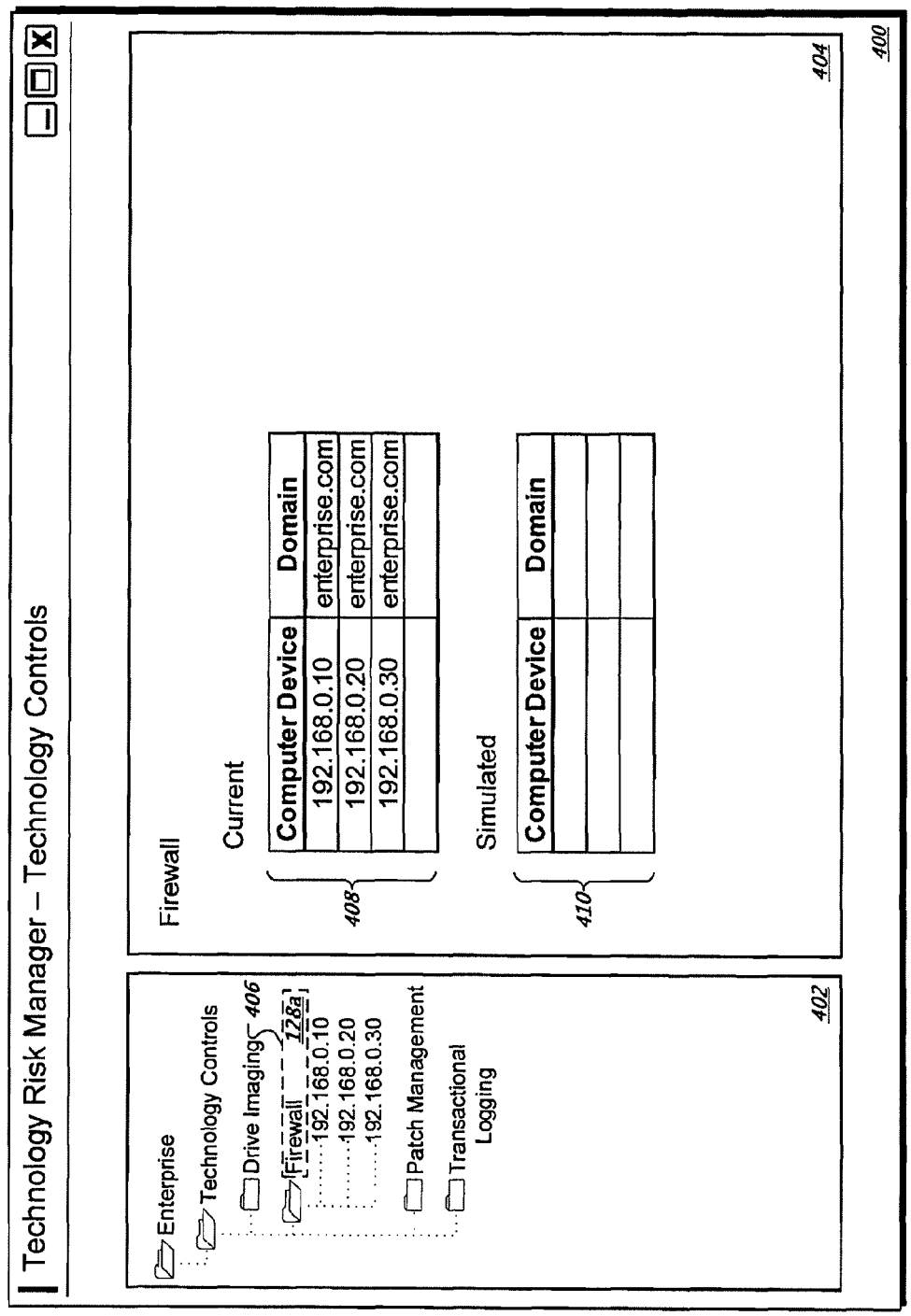
FIG. 4 is an example of a graphical user interface (GUI) where a user my input technology control information.

FIG. 4 is an example of a graphical user interface (GUI) 400 where a user may input the technology control information 128a. The GUI 400 includes a technology control list area 402 and a technology control details area 404. The details area 404 presents information about a technology control that is selected in the list area 402. Here, the technology control information 128a is selected, as indicated by a dashed line 406. The technology control information 128a describes a firewall technology control (or intrusion prevention technology control). The details area 404 presents the properties of the firewall technology control 128a and allows a user to input changes to the properties of the firewall technology control 128a. Particularly, the details area 404 includes a list 408 of computer devices that are currently affected by the firewall technology control 128a and a list 410 of computer devices affected by the firewall technology control 128a in a hypothetical or simulated scenario. A user may make changes to the properties by making an input directly into the lists 408 and 410. Alternatively, the user may make an input using another method, such as by dragging and dropping compute devices from another location onto the firewall technology control 128a shown in the list area 402 or onto one of the lists 408 and 410. In addition, a user may assign a group of computer devices to a technology control, such as a subnet of the network or a user defined functional area of the system 100. In other embodiments, the technology controls may be assessed by network scanner 116.

Referring again to FIG. 1, the TRM application 124 modifies one or more of the software characteristics 126a-c using the technology controls information 128a-c. For example, the firewall technology control 128a may modify the ftp software characteristics 126a as shown in the following table.

TABLE 1

| Software Char. | Original Value for ftp | Modification Due to Firewall Tech. Control | Resulting Value for ftp |
|---|---|---|---|
| Validation | 8 | | 8 |
| Correction | 7 | | 7 |
| Overflow | 1 | | 1 |
| Complexity | 2 | | 2 |
| Multi-Thread | 2 | | 2 |
| Structure | 4 | | 4 |
| Maintenance | 2 | | 2 |
| Configuration | 3 | | 3 |
| Invoking | 9 | | 9 |
| Privileges | 2 | | 2 |
| Multi-Function | 3 | | 3 |
| Encryption | 7 | | 7 |
| Authenticate 1 | 1 | | 1 |
| Authenticate 2 | 5 | | 5 |
| Authenticate 3 | 5 | | 5 |
| Failover | 7 | | 7 |
| Time | 1 | | 1 |
| Network | 9 | −5 | 4 |
| Trojan | 1 | | 1 |
| Audit | 5 | −2 | 3 |

In the example shown in the table above, the firewall technology control 128a reduces the software characteristic values for network usage and auditing by 5 and 2, respectively. That is, the firewall reduces the risk due to those characteristics. For example, the firewall may block some network usage and the firewall may perform logging (or auditing) of traffic through the firewall. Alternatively, a technology control may use another calculation to modify a software characteristic value, such as a multiplier. In the example above, the network usage and the auditing could instead be reduced by a factor of one half. In another alternative, the firewall technology control 128a may include information that described ports that are allowed to be accessed through the firewall. If the port used by a process affected by the firewall technology control 128a is not allowed access through the firewall, then the network usage software characteristic value may be reduced to zero. Otherwise, if the port is allowed access through the firewall, then the network usage software characteristic value may be modified by another amount or not modified at all.

The TRM application 124 calculates CIAA risk indexes for each of the processes 106a-c, 108a-c, 110a-c, and 112a-c based on their associated software characteristics information 126a-c as modified by the technology control information 128a-c. For example, the TRM application 124 may use the following equation to calculate a confidentiality risk index for the ftp process 106a:

$$RiskIndex_{Confidentiality} = Value_{Privileges} + Value_{Encryption} + Value_{Authenticate1} + Value_{Authenticate2} + Value_{Authenticate3} + Value_{Network} + Value_{Trojan}$$

In addition, each software characteristic value in a risk index calculation may be modified by a weighting factor. For example, the software characteristic value for encryption may play a larger role in confidentiality than the network usage software characteristic value, therefore the encryption software characteristic value may be weighted higher in the confidentiality risk index calculation. Also, the risk index may be normalized so that it is within a predetermined range, such as zero to one hundred for a percent probability of compromising the category associated with the risk index. Alternatively, another range may be used, such as ten through ninety percent. For example, the second range may be used where probabilities of zero and one hundred are perceived as unlikely absolutes.

The TRM application 124 may further modify CIAA risk indexes using administrative control information 130a-c. Administrative controls are business processes or methods performed by users of the system 100 that effect technology risk. For example, administrative controls may be security protocols enacted by users of the system 100. Security protocols may include, for example, those specified by or in the International Organization for Standardization (ISO) 17799, Department of Defense Information Technology Security Certification and Accreditation Process (DITSCAP), Department of Defense Information Assurance Certification and Accreditation Process (DIACAP), Health Insurance Portability and Accountability Act of 1996 (HIPAA), Payment Card Industry Security Audit Procedures (PCI), Gramm-Leach-Bliley Act (GLBA), and National Institute of Standards and Technology Special Publication (NIST SP) 800-53. The administrative control information 130a-c includes answers to questions regarding how a particular administrative control is implemented at the system 100.

The TRM application 124 applies the administrative control information 130a-c to CIAA risk indexes associated with designated functional areas or business units 132a-c within the system 100. The computer device 102a is designated as being within the business unit 132a. The computer devices 102b-c are designated as being within the business unit 132b. The computer device 102d is designated as being within the business unit 132c. The business units 132a-c may be, for example, an accounting department, a human resources department, and a sales department, respectively, within an enterprise or business. Each department may perform its own set of security protocols. For example, the administrative control information 130a may describe a HIPAA security protocol performed at the system 100. The HIPAA security protocol generally relates to the confidentiality of patient medical records. The human resources business unit 132b may employ the HIPAA administrative control 130a, while the business units 132a and 132c do not as they may not deal with patient medical records. The business units 132a and 132c may employ other administrative controls. For example, the sales business unit 132c may employ a PCI security protocol when performing credit card transactions. A business unit may also perform the same security protocol as another business unit. For example, all of the business units 132a-c may employ the DITSCAP security protocol for information risk management.

Figure 5:
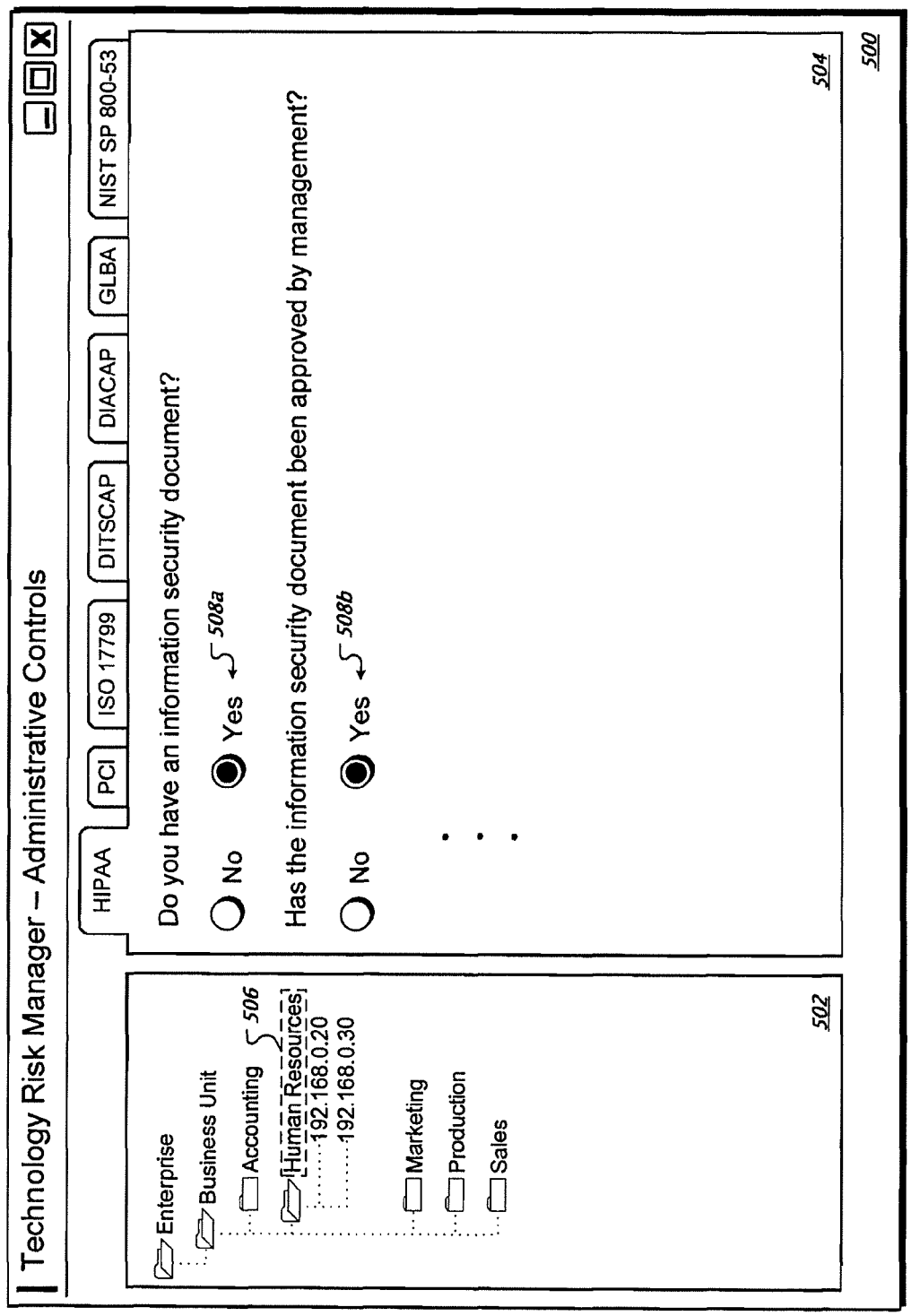
FIG. 5 is an example of a GUI where a user may input administrative control information.

FIG. 5 is an example of a GUI 500 where a user may input the administrative control information 130a. The GUI 500 includes a business unit list area 502 and an administrative control information area 504 associated with the business unit selected in the list area 502, as indicated by a dashed line 506. The list area 502 presents a list of business units in the system 100 and computer devices that are members of each of the presented business units. The information area 504 presents questions to a user regarding the particular implementation of a security protocol associated with the selected business unit. The information area 504 includes input controls 508a-b that allow the user to input answers to the security protocol questions, such as yes/no answers or other forms of response that may be evaluated to determine a level of adherence to the security protocol. In this example, the HIPAA administrative control information 130a includes the questions, "Do you have an information security document?" and, "Has the information security document been approved by management?" The HIPAA administrative control information 130a also includes the answers to the questions as input by the user in the controls 508a-b.

Referring again to FIG. 1, the TRM application 124 determines a ratio of affirmative answers to the total number of questions for each administrative control (or security protocol). The administrative control information 130a-c also includes modifiers to be applied to one or more of the CIAA risk indexes for each computer device (or processes executing at the computer device) within a business unit effected by an administrative control. For example, the HIPAA administrative control information 130a may include a value (e.g., 5.7) to be added to the confidentiality risk indexes of the processes 108a-c and 110a-c within the business unit 132b. The TRM application 124 may scale the additive value based on the number of affirmative answers to the questions in the HIPAA administrative control information 130a. The TRM application 124 adds (or otherwise factors in) the scaled value to the confidentiality risk indexes for the processes 108a-c and 110a-c.

The TRM application 124 aggregates the CIAA risk indexes of the processes 106a-c, 108a-c, 110a-c, and 112a-c into CIAA risk indexes for the computer devices 102a, 102b, 102c, and 102d, respectively. The TRM application 124 aggregates the CIAA risk indexes for the computer devices 102a, 102b-c, and 102d into CIAA risk indexes for the business unit 132a, 132b, and 132c, respectively. The TRM application 124 aggregates the CIAA risk indexes for the computer devices 102a-d into CIAA risk indexes for the system 100. The aggregation may be an average of the particular risk indexes being aggregated. For example, the processes 108a-c and 110a-c may have confidentiality risk indexes of 60.3%, 73.4%, 21.2%, 43.5%, 11.7%, and 30.3%, respectively. The aggregated confidentiality risk indexes for the computer devices 102b-c are then 51.6% and 28.5%, respectively. The confidentiality risk index for the business unit 132b is then 40.1%.

The TRM application 124 outputs the aggregated CIAA risk indexes as one or more technology risk models 134a-c. The technology risk models 134a-c present the CIAA risk indexes to the user. A technology risk model may include a particular analysis of the system 100. For example, the technology risk model 134a may include CIAA risk indexes that are not modified by technology and/or administrative controls. The technology risk model 134b may include a currently implemented risk model including the effects of implemented technology and/or administrative controls. The technology risk model 134*c* may include simulated elements in its risk model, such as simulated addition or removal of processes, computer devices, technology controls, and/or administrative controls. A technology risk model may be represented using a graph. For example, the graph may show the number of computer devices versus the risk index of the computer devices for a particular risk category, such as confidentiality.

Figure 6:
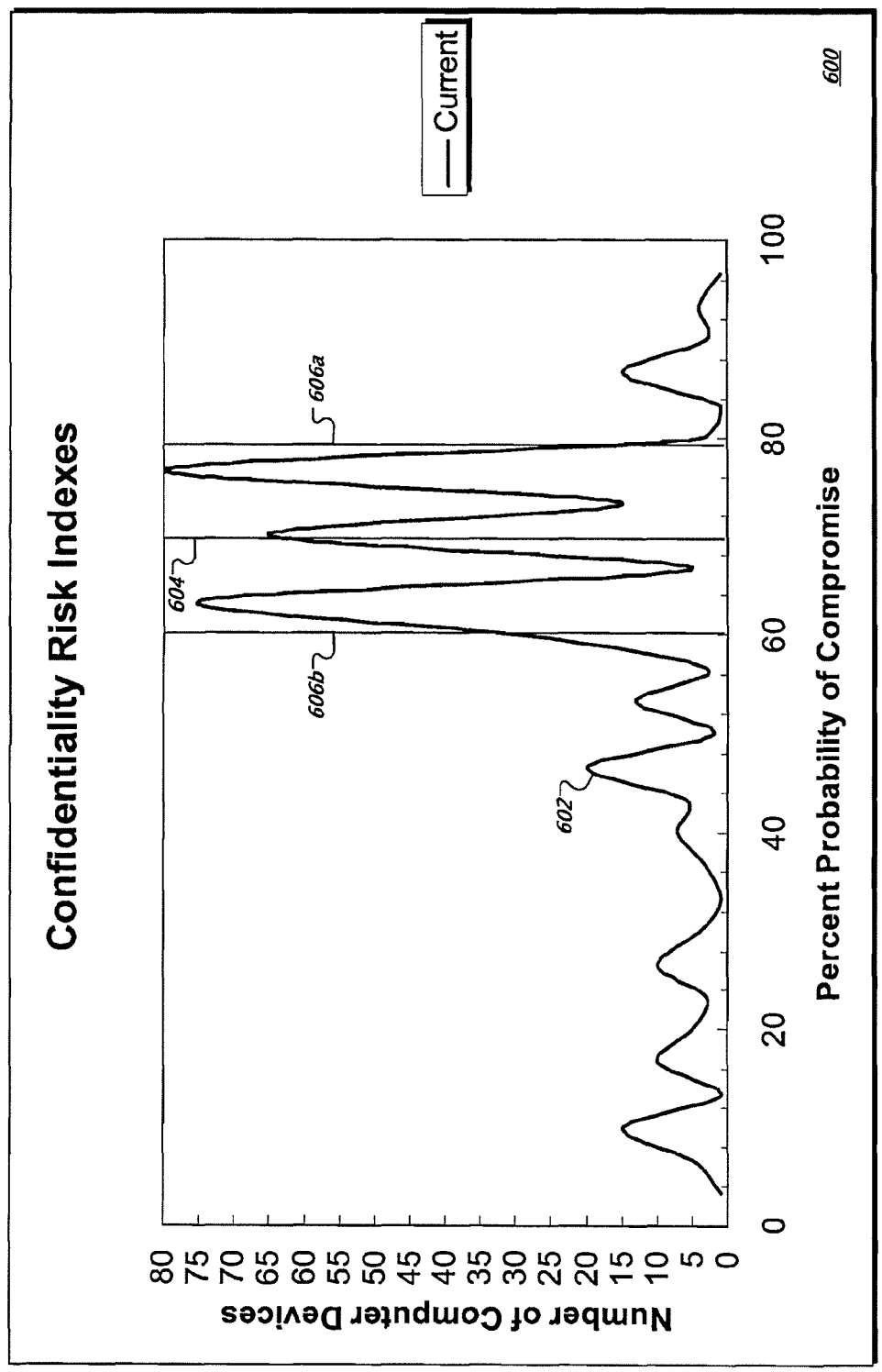
FIG. 6 is an example of a graph for presenting confidentiality risk indexes associated with a current risk model.

FIG. 6 is an example of a graph 600 for presenting confidentiality risk indexes associated with the current risk model 134*b*. The graph 600 shows a line 602 that represents the number of computer devices in the system 100 at each value of the confidentiality risk index. The graph 600 also shows a mean 604 along with upper and lower standard deviations 606*a-b* from the mean 604. The mean 604 indicates an average confidentiality risk index for the computer devices in the system 100. The standard deviations 606*a-b* indicate a level of dispersion in the confidentiality risk indexes of the computer devices. Here, many computer devices on the line 602 lie outside the standard deviation 606*a-b*. This indicates that there is a correspondingly low consistency between computer devices in the way risk is managed.

Referring again to FIG. 1, the TRM application 124 may present a report to a user that compares two or more of the technology risk models 134*a-c*. For example, the TRM application 124 may present a graph that shows the number of computer devices having a particular risk index for both the current technology risk model 134*b* and the simulated risk model 134*c*.

Figure 7:
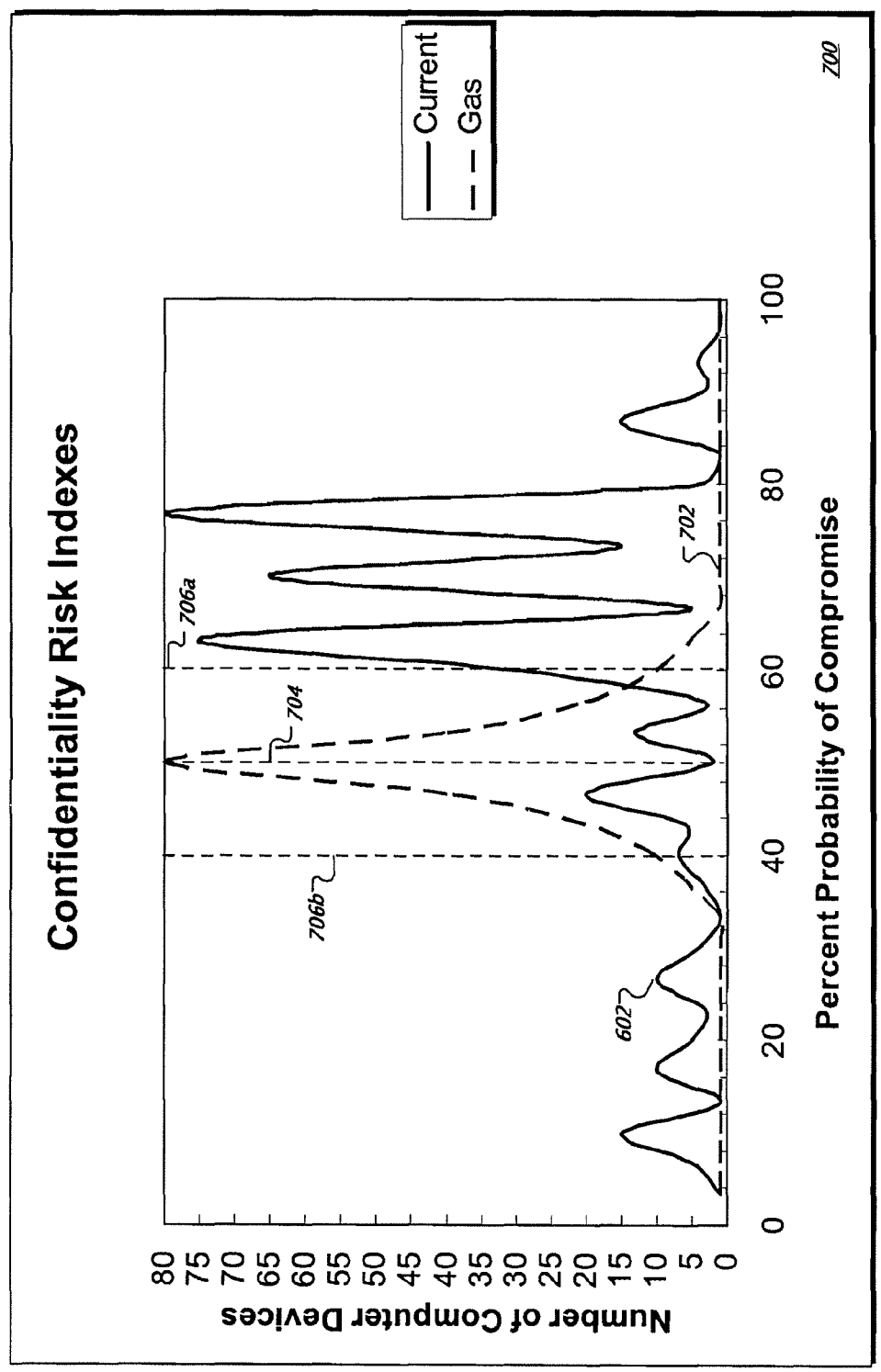
FIG. 7 is an example of a graph for comparing confidentiality risk indexes associated with a current risk model and a simulated risk model.

FIG. 7 is an example of a graph 700 for comparing confidentiality risk indexes associated with the current risk model 134*b* and the simulated risk model 134*c*. The graph 700 shows the line 602 as described above and a line 702 representing the simulated risk model 134*c*. The line 702 has an associated mean 704 and upper and lower standard deviations 706*a-b*. A user may use the lines 602 and 702 to determine the benefits of enacting the simulated changes to the system 100. For example, the user may compare the amount that the mean 704 is lowered from the value of the mean 604.

Figure 8:
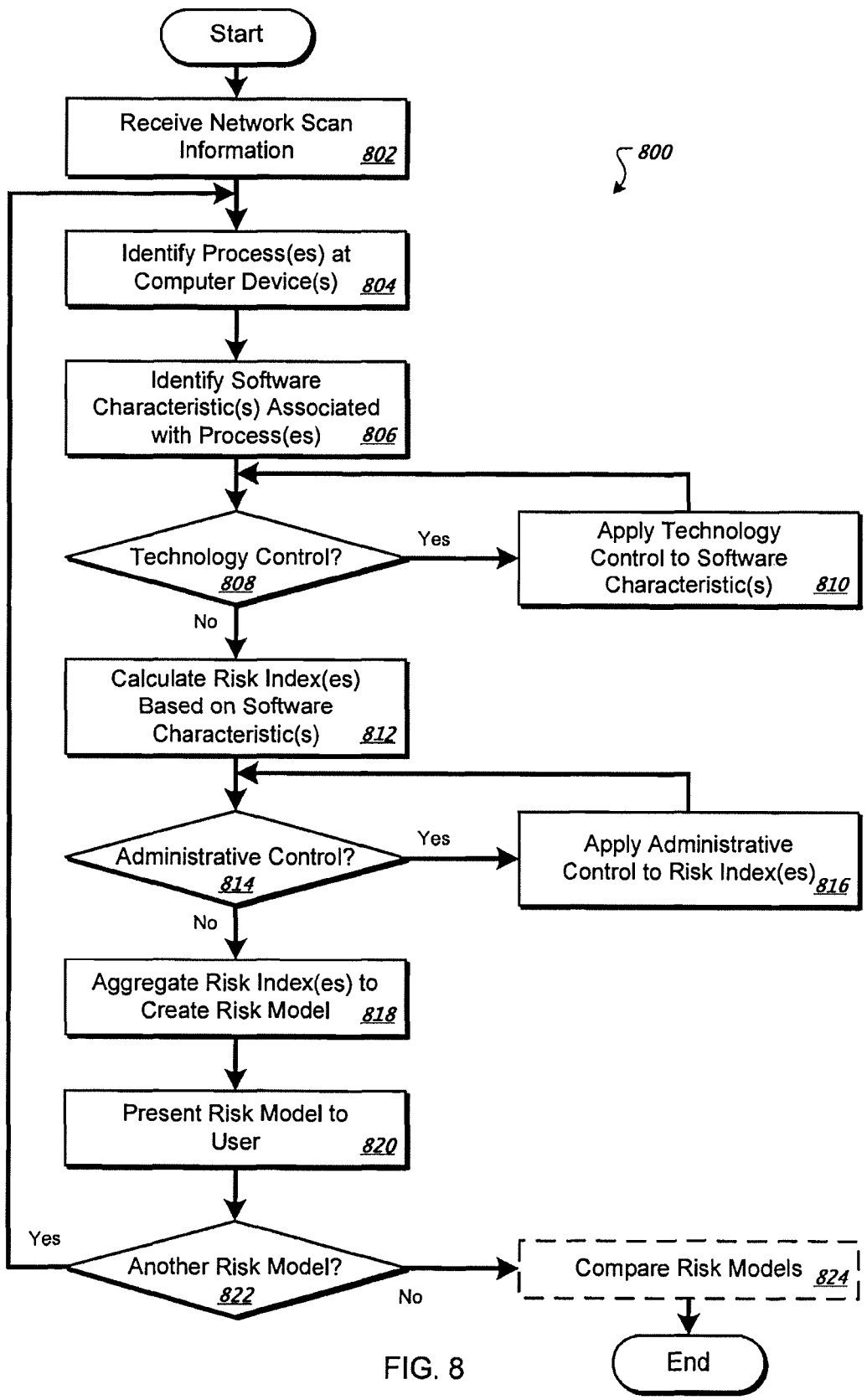
FIG. 8 is a flow chart showing an example of a process for technology risk management.

FIG. 8 is a flow chart showing an example of a process 800 for technology risk management. The process 800 may be performed, for example, by a system such as the system 100. For clarity of presentation, the description that follows uses the system 100 as the basis of an example for describing the process 800. However, another system, or combination of systems, may be used to perform the process 800.

The process 800 begins with receiving (802) network scan information. For example, the data store 122 may receive the network scan information 118 from the network scanner 116.

The process 800 identifies (804) one or more processes executing at one or more computer devices. For example, the TRM application 124 may use the network scan information 118 to determine the processes 106*a-c*, 108*a-c*, 110*a-c*, and 112*a-c* executing at the computer devices 102*a*, 102*b*, 102*c*, and 102*d*, respectively.

The process 800 identifies (806) one or more software characteristics associated with each of the one or more processes. For example, the TRM application 124 may identify the software characteristics 126*a-c* as being associated with the processes 106*a-c*, respectively.

If there is a technology control to be processed (808), the process 800 applies (810) the technology control to the one or more software characteristics associated with one or more of the processes. For example, the TRM application 124 applies the technology control information 128*a* to the processes executing at the computer devices 102*a-c*.

The process 800 calculates (812) one or more risk indexes associated with the computer devices based on the software characteristics of the processes executing at the computer devices. For example, the TRM application 124 calculates the confidentiality risk index for the ftp process 206*a* by adding the weighted software characteristic values for privileges, encryption, authentication 1, authentication 2, authentication 3, network usage, and the Trojan indicator. The TRM application 124 then normalizes the risk index to lie within an accepted range, such as 10% and 90%.

If there is an administrative control to be processed (814), then the process 800 applies (816) the administrative control to the one or more risk indexes associated with one or more of the computer devices. For example, the TRM application 124 applies the HIPAA administrative control 130*a* to the risk indexes of the processes 108*a-c* and 110*a-c* in the human resources business unit 132*b*. Alternatively, the administrative controls may be applied to the software characteristics (or software characteristics modified by technology controls) before a risk index is calculated.

The process 800 aggregates (818) the risk indexes to create a risk model. For example, the TRM application 124 aggregates the risk indexes of the processes 106*a-c*, 108*a-c*, 110*a-c*, and 112*a-c* to form the technology risk models 134*a-c*. The aggregation may include weighting of process risk indexes relative to one another based on one or more variables such as security or threat trends, perceived likelihood of particular attacks, ubiquity of vulnerability in a business unit or organization, or the like.

The process 800 presents (820) the risk model to a user. For example, the TRM application 124 may present the graph 600 to the user representing the technology risk model 134*b*.

If there is another risk model to be processed (822), then the process 800 again identifies (804) one or more processes executing at one or more computer devices. Otherwise, if there is no other risk model to process, then the process 800 optionally compares (824) two or more risk models. For example, the TRM application 124 may present the graph 700 to the user comparing the technology risk models 134*b-c*.

Figure 9:
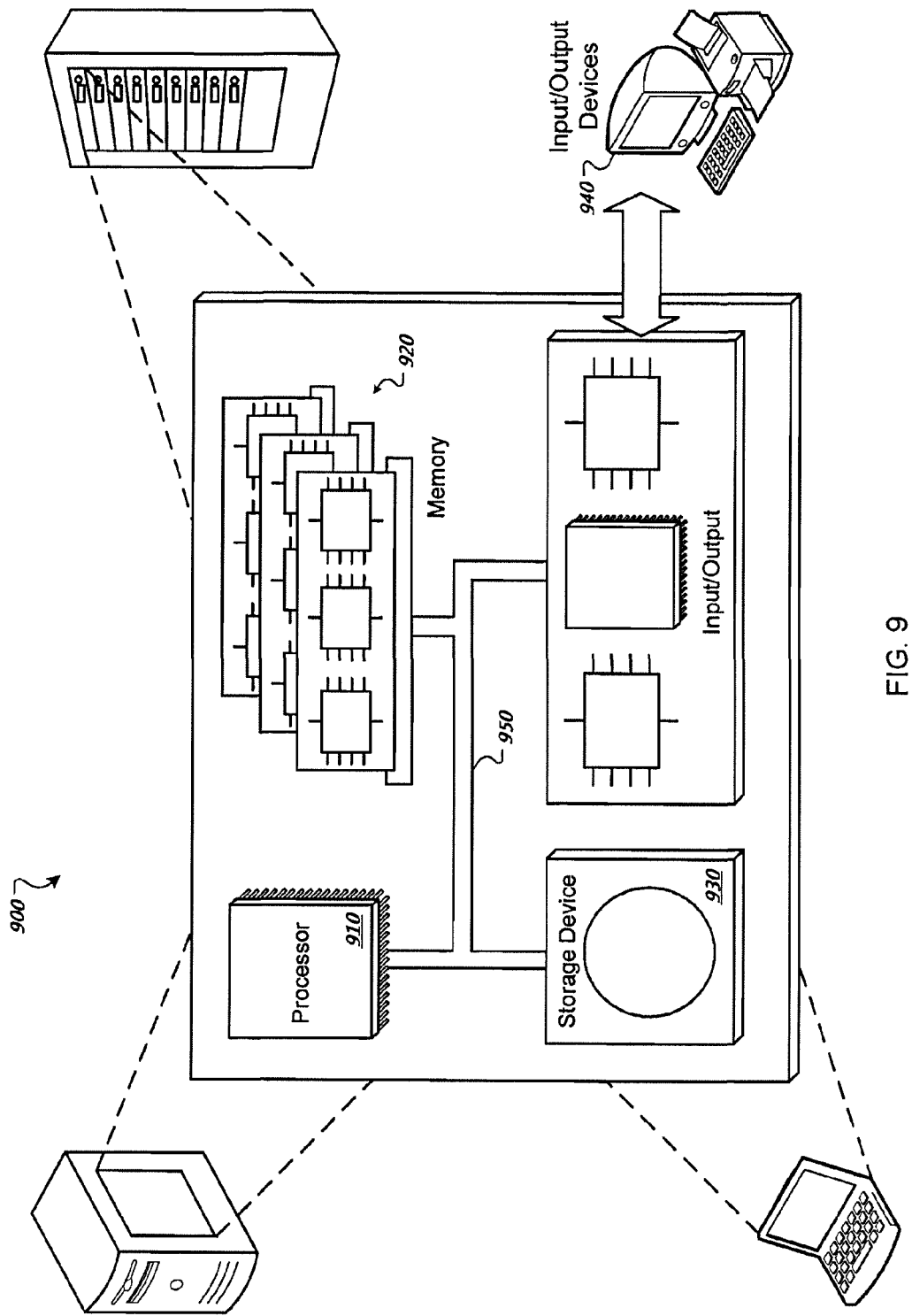
FIG. 9 is a schematic diagram showing an example of a computing system that can be used in connection with computer-implemented methods described in this document.

FIG. 9 is a schematic diagram of a system 900 suitable for executing the operations described in association with any of the computer-implement methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/ output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Various algorithms can be used to assess a risk index according to the foregoing teachings. The measurement of risk for a process running on a network can generally be described by a set of software characteristics, implemented technologies, administrative processes, known vulnerabilities, potential attack schemes, and interdependency or interrelations among the foregoing.

A software characteristic can be represented by a constant, a series of functions, or a combination thereof. As constants the software characteristics may embody a reduction of risk based on the strength or relevance of that characteristic to a particular security dimension. Conversely the constant could embody an increase in risk based on a known flaw in the software design. Constant values may be empirically determined for a given algorithm based on testing in a known set of environments. As a series of functions the software characteristic could be an algorithm that receives inputs from a series of scanning tools that report information about said software.

A software characteristic can be defined in at least the following ways or combinations thereof. Software characteristics may be determined according to a dynamic algorithm based on the number of other adjacent network processes that are running at the same node. Software characteristics may also, or alternatively, indicate the average vulnerability assessed by a given by set of a scanning tools. The software characteristic may be a constant paired with a multiplier that increases the risk metric of the software in question. Alternatively, the software characteristic may reflect a percentage of risk reduction applied to a starting value for risk, for example 100. Another approach to defining software characteristics is to set them according to the rank ascribed to a given process by published rankings of known software vulnerabilities such as SANS FBI Top 20. Yet another alternative is to define the software characteristics as a constant value that is added to an overall risk metric for the process based on whether it the service is a system process or rather a process that is executed by a user. Another approach is to set software characteristics as functions that i) calculate (by a multiplication function) a reduction in risk based on external data relating the number of different types of network communication the process performs (e.g., serial, TCP, UDP, IPC) and/or ii) determine a multiplicative increase in risk based on vulnerabilities found by a third party scanning tool.

Technology controls can likewise be factored in or accounted for in various ways in the assessment of an overall risk index. The approaches are described may be used individually or in combination. They may be factored in as a percentage of risk reduction based on industry experience that modifies the overall risk on a host. The technology controls may be a constant value added to the overall risk index for the enterprise. They may also be constant values that are subtracted from the overall risk index for the enterprise. A dynamic method for assessing the affect of technology controls calculates an overall reduction in risk for an enterprise based on the number of hosts affected and the types of processes on said hosts. The technology controls may be algorithmically paired with software characteristics and each implemented technology may be assessed a value which is used to modify a constant or coefficient of the associated software characteristic. Another approach is to calculate from the technology controls an overall risk adjustment for all hosts adjacent to the applied technology control(s).

Administrative controls can likewise modify the risk index calculation in various ways. The following approaches are exemplary and may be used individually or in combination. In one approach, administrative controls modify risk index according to a dynamic method that modifies the overall risk per host based on the type of administrative process. In another approach, administrative controls may affect a percentage of risk reduction based on the level of compliance across all selected standards. In yet another approach, administrative controls may represent a ratio of affirmative answers to negative answers made in response to queries such as those made pursuant to ISO17799 and DITSCAP. Alternatively, administrative controls may be used to an increase or decrease the risk index by a constant value based on the existence of said administrative process.

In one illustrative example, values for Confidentially, Integrity, Audit and Accountability metrics are determined as follows:

$$\text{Metric} = (\text{Sum}[SC_n * \text{MODIFIER}_n]) * W$$

where $SC_n$ are the software characteristics identified as having an impact on the metric, MODIFIER is a coefficient from 0 to 1 that measures to relative significance of the software characteristic to the metric in question, and W is a scaling variables that are selected so that C ranges between 1 and 100. In the illustrative embodiment, telnet has an encryption characteristic of 9 and the multiplier is as constant determined by how long it would take an attacker to compromise the system in 50,000 minutes.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Furthermore, it will be understood that various modifications may be made without departing from the spirit and scope of the following claims. Accordingly, other implementations are within the scope of the following claims.

What is claimed is:

1. A computer-implemented method for technology risk assessment, comprising:
    identifying software characteristic values, each being associated with one of a set of software characteristics including at least respective user oriented, software oriented, system oriented and security oriented software characteristics, the software characteristics being associated with multiple sets of at least one software process each, wherein each software characteristic defines a property of an associated software process as a value within a range, wherein each software characteristic value reflects a degree of contribution to at least one of multiple security risk categories by the software process;
    determining a modifier and applying it to the software characteristic value of at least one of the software characteristics of at least one of the software processes, the modifier depending on an extent to which a technology control increases or decreases a degree of contribution by the software process to at least one of the security risk categories associated with the software characteristic;
    calculating risk indexes, at least one for each of the multiple security risk categories regarding each of the software processes, the risk indexes including at least respective confidentiality, data, reviewability, communication and security risk indexes, wherein for each software process each risk index is determined as a function of at least a subset of the software characteristic values of the software process, and wherein at least one of the subsets includes the modified software characteristic value;
    aggregating at least some of the risk indexes into (i) a computer network risk index based on the corresponding risk indexes of the set of software processes that are executed at a computer device or (ii) a computer device risk index for the computer device; and
    presenting an enterprise risk assessment on a display device, wherein the enterprise risk assessment is based on the risk indexes for the software processes, and the computer network risk index or the computer device risk index, wherein the enterprise risk assessment indicates whether computer devices have particular aggregated risk index values for one or more of the multiple security risk categories.

2. The method of claim 1, further comprising:
    identifying a first scenario comprising a first group of one or more software processes and at least one technology control applied to at least one software characteristic of the first group of one or more software processes;
    calculating a first set of one or more risk indexes for the first scenario;
    identifying a second scenario, comprising a second group of one or more software processes and at least one technology control applied to at least one software characteristic of the second group of one or more software processes;
    calculating a second set of one or more risk indexes for the second scenario; and
    presenting a risk assessment comprising the first and second set of one or more risk indexes.

3. The method of claim 2, further comprising presenting the first set of risk indexes and the second set of risk indexes in a comparative manner.

4. The method of claim 1, further comprising:
    identifying a first business unit comprising a first group of one or more software processes;
    calculating a first set of risk indexes for the first business unit;
    identifying a second business unit comprising a second group of one or more software processes;
    calculating a second set of risk indexes for the second business unit; and
    determining at least one composite risk index based on the first and second groups of risk indexes.

5. The method of claim 1, further comprising:
    receiving an identification of at least one administrative control to be applied to the computer network formed by the computer devices, wherein the administrative control defines an implementation of a security policy; and
    applying a modifier to the software characteristic value of at least one of the software characteristics of at least one of the software processes, the modifier being determined as a function of an extent to which the identified administrative control increases or decreases the degree of contribution by the software process to the at least one of the security risk categories associated with the software characteristic.

6. The method of claim 5, further comprising:
    receiving answers to options regarding the implementation of the administrative control; and scaling the modifier for the administrative control based on a ratio of affirmative ones of the answers to negative ones of the answers.

7. The method of claim 1, wherein calculating the risk index for each of the multiple security risk categories regarding each of the software processes comprises calculating an intermediate risk index as a product and sum function of the modified software characteristic value and one or more of the other software characteristic values.

8. The method of claim 7, further comprising summing one or more of the intermediate risk indexes with an administrative control value.

9. The method of claim 1, wherein the software characteristics comprise characteristics associated with validation, correction, overflow, or multi-thread.

10. The method of claim 1, wherein the software characteristics comprise characteristics associated with structure, maintenance, configuration, or encryption.

11. The method of claim 1, wherein the software characteristics comprise characteristics associated with failover or complexity.

12. The method of claim 1, wherein identifying the software characteristic values comprises dynamically calculating the software characteristic values.

13. The method of claim 1, wherein the technology control comprises patch management or re-imaging.

14. The method of claim 1, wherein the technology control comprises intrusion detection, intrusion prevention or transactional logging.

15. The method of claim 1, wherein the technology control comprises alarming, alerting, virus scanning, token based authentication or use of digital signatures to authenticate data and permissions.

16. The method of claim 1, wherein the technology control comprises offsite backup, encrypted data storage or use of a centralized location for user authentication.

17. The method of claim 1, wherein a contribution of at least one of the software characteristic values to a first one of the multiple security risk categories is weighted higher than a contribution of the at least one of the software characteristic values to a second one of the multiple security risk categories.

18. A computer program product, encoded on a machine-readable storage device, operable to cause one or more processors to perform operations for technology risk assessment, the operations comprising:

receiving software characteristic values for a set of software characteristics for each software process in a plurality of sets of software processes, wherein the set of software characteristics for each software process includes a level of input validation employed by the software process, a level of error correction and detection employed by the software process, a level of buffer overflow prevention employed by the software process, a level of complexity of the software process, a level of multi-threaded processing employed by the software process, a level of structure of the software process, a level of maintenance required to keep the software process working in a proper condition, a level of configuration file usage by the software process, a level of invoking other software processes employed by the software process, a level of user privilege checks performed by the software process, a level of flexibility contained in the software process, a level of encryption or hashing used by the software process, a level of authentication employed by the software process where something known to a user is provided, a level of authentication employed by the software process where something a user physically possesses is provided, a level of authentication employed by the software process where a user provides something from himself or herself, a level of backup operations for automatically switching if the software process fails, a level of time function usage by the software process, a level of network usage by the software process, a level of Trojan behavior by the software process, and a level of logging used by the software process;

receiving a user input identifying a technology control to be applied to one or more of the software processes, wherein the identified technology control includes at least one selected from the group of: patch management, data storage re-imaging control, network or computer intrusion detection, network or computer intrusion prevention, transactional logging of network or computer activities, outsourcing logs to another entity, log review, alarming and alerting, a dummy computer designed to attract an intruder, computer virus scanning or removal, token based two-factor authentication, use of digital signatures to authenticate data and permissions, offsite backup for data storage, server clustering, encrypted data storage, use of strong passwords, centralized location for user authentication, fingerprint biometric authentication, and hand geometry biometric authentication;

receiving a technology control value that is a function of an impact the identified technology control has on at least one risk index category associated with one or more of the software processes;

receiving a user input identifying an administrative control to be applied to one or more of the software processes;

receiving an administrative control value, the administrative control value being a function of an impact the identified administrative control has on at least one risk index category associated with one or more of the software processes;

determining a set of risk indexes, at least one for each software process, wherein a modifier is applied to one or more software characteristic values associated with one or more software processes, the modifier depending at least in part on an extent to which the identified technology control or the administrative control increases or decreases a risk index associated with the software characteristic, wherein the risk indexes include at least respective confidentiality, data, reviewability, communication and security risk indexes; and outputting a risk model report that comprises the sets of risk indexes.

19. The computer program product of claim 18, the operations further comprising:

identifying a first scenario comprising a first group of one or more software processes and at least one technology control applied to at least one software characteristic of the first group of one or more software processes;

calculating a first group of one or more risk indexes for the first scenario;

identifying a second scenario, comprising a second group of one or more software processes and at least one technology control applied to at least one software characteristic of the second group of one or more software processes; and calculating a second group of one or more risk indexes for the second scenario.

20. The computer program product of claim 19, wherein the risk model report presents the first group of risk indexes and the second group of risk indexes in a comparative manner.

21. The computer program product of claim 18, the operations further comprising:
- identifying a first business unit comprising a first group of one or more software processes;
- calculating a first group of risk indexes for the first business unit;
- identifying a second business unit comprising a second group of one or more software processes;
- calculating a second group of risk indexes for the second business unit; and
- determining at least one composite risk index based on the first and second groups of risk indexes.

22. A computer program product, encoded on a machine-readable storage device, operable to cause one or more processors to perform operations for technology risk assessment, the operations comprising:
- identifying software characteristic values, each being associated with one of a set of software characteristics including at least respective user oriented, software oriented, system oriented and security oriented software characteristics, the software characteristics being associated with multiple sets of at least one software process each, wherein each software characteristic defines a property of an associated software process as a value within a range, wherein each software characteristic value reflects a degree of contribution to at least one of multiple security risk categories by the software process;
- determining a modifier and applying it to the software characteristic value of at least one of the software characteristics of at least one of the software processes, the modifier depending on an extent to which a technology control increases or decreases a degree of contribution by the software process to at least one of the security risk categories associated with the software characteristic;
- calculating risk indexes, at least one for each of the multiple security risk categories regarding each of the software processes, the risk indexes including at least respective confidentiality, data, reviewability, communication and security risk indexes, wherein for each software process each risk index is determined as a function of at least a subset of the software characteristic values of the software process, and wherein at least one of the subsets includes the modified software characteristic value;
- aggregating at least some of the risk indexes into (i) a computer network risk index based on the corresponding risk indexes of the set of software processes that are executed at a computer device or (ii) a computer device risk index for the computer device; and
- presenting an enterprise risk assessment on a display device, wherein the enterprise risk assessment is based on the risk indexes for the software processes, and the computer network risk index or the computer device risk index, wherein the enterprise risk assessment indicates whether computer devices have particular aggregated risk index values for one or more of the multiple security risk categories.

* * * * *